United States Patent
Andrews et al.

[11] Patent Number: 5,845,388
[45] Date of Patent: Dec. 8, 1998

[54] METHOD FOR PRODUCTION OF ARCHERY BOW RISERS OF VARIOUS SHAPES

[75] Inventors: Andy Andrews, Hixson; Spencer Land, Signal Mountain, both of Tenn.

[73] Assignee: Spenco, Inc., Dunlap, Tenn.

[21] Appl. No.: 974,587

[22] Filed: Nov. 19, 1997

[51] Int. Cl.$^6$ ........................................................... B21B 1/46
[52] U.S. Cl. ............................... 29/527.1; 124/88; 124/89
[58] Field of Search ............................. 29/527.1; 124/88, 124/89

[56] References Cited

U.S. PATENT DOCUMENTS

| | | |
|---|---|---|
| 4,693,230 | 9/1987 | Sugouchi . |
| 5,141,689 | 8/1992 | Simonds . |
| 5,335,644 | 8/1994 | Smith et al. . |
| 5,365,650 | 11/1994 | Smith et al. . |
| 5,501,208 | 3/1996 | Simonds . |
| 5,595,168 | 1/1997 | Martin . |
| 5,679,379 | 10/1997 | Fabbricante et al. . |
| 5,682,871 | 11/1997 | Walk et al. . |

*Primary Examiner*—Carl J. Arbes
*Attorney, Agent, or Firm*—Chernoff, Vilhauer, McClung & Stenzel, LLP

[57] ABSTRACT

A method of producing a set of archery bow risers having a variety of shapes is taught in which a workpiece is designed having a shape that encompasses each one of the variety of shapes. A set of dies is produced for producing the workpiece and the dies are used to form a set of workpieces via forging, die-casting or composite resin/fiber molding. Finally, a set of bows having mutually different shapes are machined from the workpieces. The method taught avoids the expense of producing a new set of dies for each new archery bow riser design.

12 Claims, 1 Drawing Sheet

METHOD FOR PRODUCTION OF ARCHERY BOW RISERS OF VARIOUS SHAPES

BACKGROUND OF THE INVENTION

The present invention relates to a method of producing archery bow risers.

A compound bow is a necessary tool for serious target shooting archers and bow and arrow hunters. Such a bow typically includes a fairly rigid center portion, typically termed a "handle" or a "riser." A flexible limb is attached to either longitudinal end of the riser to form the familiar bow shaped structure.

The production of bow risers has traditionally been an expensive part of the production of a bow. Until fairly recently risers were typically forged, necessitating the production of a new set of forging dies for every new design. This created a conflict between the goal of spreading the fixed costs of production for each riser design over as many production units as possible and the goal of introducing a continuous stream of new riser designs that exploit new materials and new ergonomic insights. The fixed costs of setting up production for forged risers also conflicts with the goal of offering every possible permutation of bow riser features to conform to the preferences of each individual archer.

It typically takes four dies to form an archery bow riser: a blocker die for the initial forming of a metal slug, a forging die to create the finished shape, a trim die for trimming away the parting line and a coin die for insuring correct shape conformity of the work-piece or blank. The set of dies needed to produce a single workpiece design will be referred to in this application as a single set of production dies. For short production runs, the cost of producing the set of production dies is a significant portion of the costs of production.

Another process which is presently used in the production of bow risers is die casting, in which molten metal is introduced into a die to produce the bow riser shape.

Archery bow risers may also be formed of resin/fiber composite materials. A multitude of techniques can be used to produce a composite material bow riser. One technique is resin transfer molding (RTM), in which resin is pumped into a die that already contains a preformed fiber reinforcement (a "preform"). The resin is driven into the air spaces between the fibers and allowed to set to form the composite riser.

Hand lay-up molding includes forms of molding in which a portion of the process of placing fibers and resin in the die is performed by hand. This technique includes a method that is quite similar to RTM except for that the preform is custom made for each molding operation. Hand lay-up molding is typically used for short production runs.

Yet another technique for forming archery bow risers is structural reaction injection molding (SRIM) in which two different resins are mixed together as they are pumped into a die containing a preform.

Still another technique for forming archery bow risers is compression molding. Compression molding utilizes sheet molding compound (SMC), a commercially available material, that comprises sheets of fiber bearing resin. A "charge" is cut from an SMC sheet or a stack of SMC sheets. The charge is placed in a die and then compressed to form a riser of the desired shape.

Die casting and the above described techniques for forming fiber reinforced resin risers suffer from the same problem encountered in forging risers: The fixed costs of producing a set of dies for a specific design of archery bow riser is prohibitively expensive for short production runs.

With the advent of numerically controlled machining equipment it has become economically feasible to machine bow risers from a solid billet of metal (typically an aluminum alloy) or a solid piece of composite material. This option greatly reduces the fixed costs of producing a new bow riser design. Unfortunately, it increases the variable costs of production because each machining operation is time consuming and produces a great deal of scrap metal which must be collected and recycled, or scrap composite material which is typically not recyclable. Moreover, a machined riser typically must be made slightly thicker and heavier than a comparable forged riser to compensate for the nonperformance of the strength imparting forging operation. Bow and arrow hunters who typically carry their bows long distances naturally prefer a lighter bow.

One approach to reducing the variable costs of machining a bow riser is described in U.S. Pat. Nos. 5,335,644 and 5,365,650 entitled "Extruded Handle for Archery Bow" and "Method for Making an Extruded Handle for an Archery Bow," respectively. These two patents share inventors and assignee. Both patents describe a method that includes extruding a sheet having the front profile of a bow riser, slicing the sheet into workpieces and machining each workpiece to produce a bow riser.

Unfortunately, this method leaves quite a bit to be desired. The workpieces produced by slicing the extruded sheets have the front profile of a bow riser but are rectangular when viewed from the side. Therefore, the side view profile of the bow riser must be machined from a rectangle of metal, which is quite dissimilar to the desired riser shape. This machining is time consuming and creates a considerable amount of scrap. Another disadvantage is created by the tendency of extruded metal to vary from the ideal shape due to the fundamental limitations of the extrusion process. This causes a disturbing variation in the front profile of the risers.

Finally, the extruded material is less strong than is desirable. The use of a stronger material permits the production of lighter, thinner risers that nevertheless have adequate strength.

What is desired but lacking therefore, is a method of producing a set of archery bow risers that does not require the production of a set of dies for each new riser shape yet compels variable costs lower than those encountered in the machining of a riser from a rectangular workpiece.

SUMMARY OF THE INVENTION

The present invention is a method of producing a set of archery bow risers having various shapes. First a workpiece shape is determined that independently encompasses each of the various shapes. Next, one set of production dies is produced. This set is used to form a set of the workpieces each having the workpiece shape. The workpieces are formed either through forging, die-casting or molding resin/fiber composite materials.

Finally, the set of archery bow risers are machined from the set of workpieces. This method permits the production of a great range of archery bow riser shapes using only one set of production dies.

In this context, the phrase "one set of dies" means a set of dies sufficient to form a single workpiece design or shape. In the forging context this would include a blocker die, a forging die, a trim die and a coin die. In the die-cast process and the composite material molding process fewer dies are needed.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
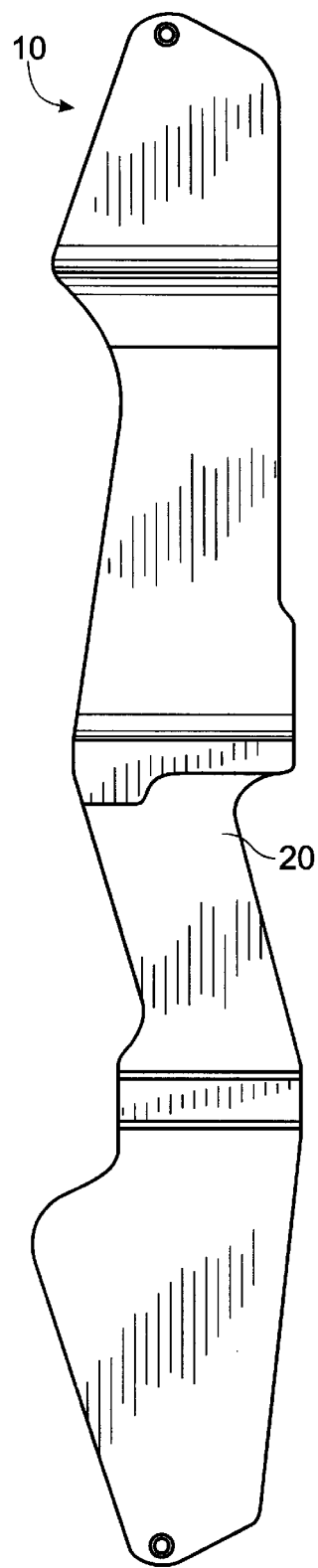
FIG. 1 is a side view of an archery bow riser workpiece according to the present invention.
Figure 2:
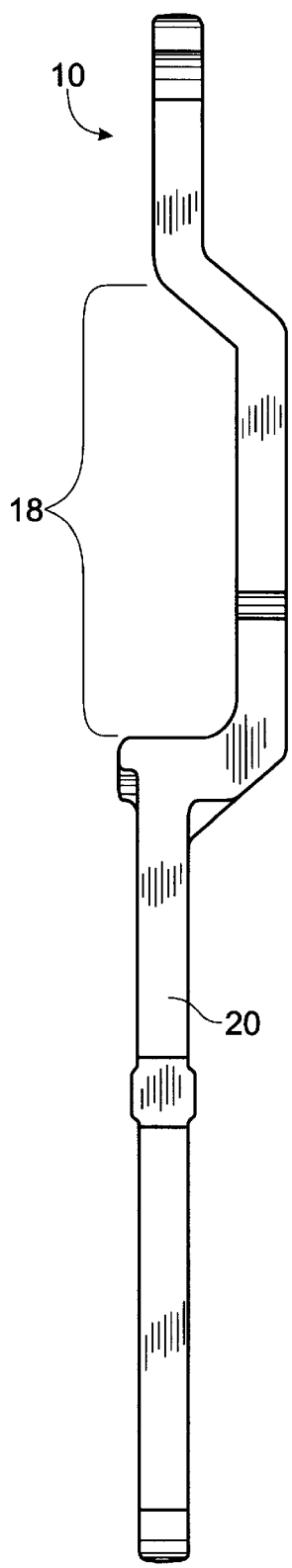
FIG. 2 is a front view of the archery bow riser workpiece of FIG. 1.
Figure 3:
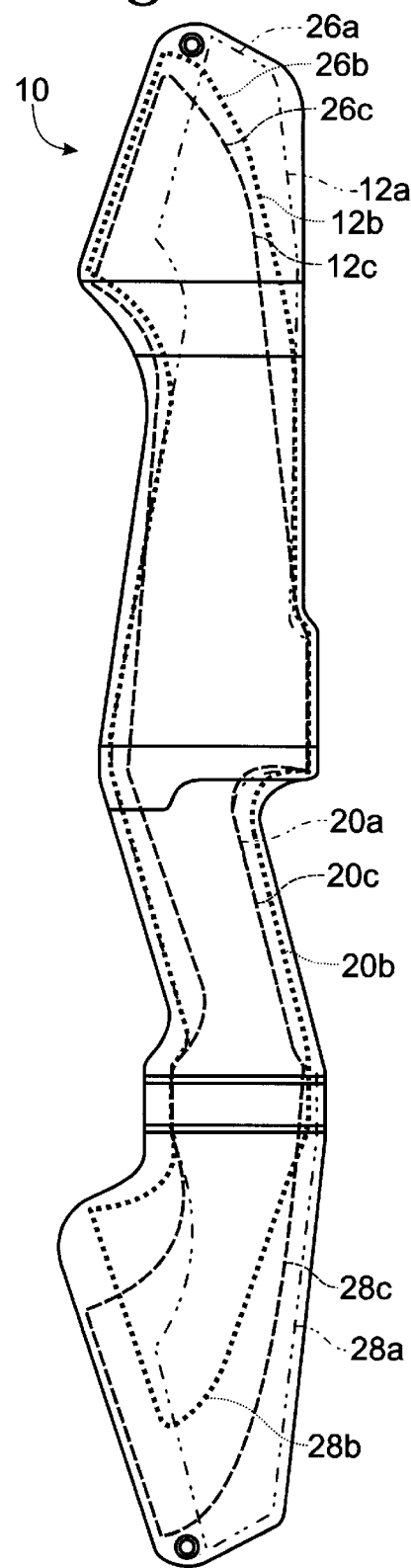
FIG. 3 is a side view of the archery bow riser workpiece of FIG. 1 with the profiles of archery bow riser designs superimposed upon it.

FIGS. 1 and 2 show a side view and a front view, respectively, of a workpiece 10 for use in producing archery bow risers according to the present invention. FIG. 3 shows the same side view as FIG. 1, but with the side profiles of a first, second and third archery bow riser 12a, 12b and 12c, respectively, super-imposed onto it. By examining FIGS. 1–3, one may see that although archery bow risers have differing shapes, there are enough elements in common so that all of the shapes may be accommodated by a single workpiece.

Workpiece 10, includes a window 18 that allows an arrow to pass unobstructed through the center line of the bow. A handle 20 of workpiece 10 is machined into a finished handle 20a, 20b and 20c, for risers 12a, 12b and 12c, respectively. In the finished bow a grip piece of resilient material generally fits over handle 20a, 20b, and 20c, to permit the archer to comfortably hold the bow. Handle 20 is one good example of the need for many different bow riser designs. First riser 12a and second riser 12b both have a fairly thick handle 20a and 20b, respectively. Third riser 12c, however, has a fairly narrow handle 20c to accommodate archers with small hands.

Each riser 12a, 12b and 12c has a differently sloped top limb attachment area 26a, 26b and 26c, respectively, and a bottom limb attachment area 28a, 28b and 28c, respectively, to accommodate differently sloping limbs. (The limbs are the more flexible part of the bow to which the pulley and string mechanisms are attached.)

The method of the present invention begins with the design of a workpiece that encompasses all of the different desired archery bow riser designs. Next, a set of dies is produced for this shape. Then, these dies are used to form a set of workpieces through forging, die-casting, or resin/fiber composite molding.

If the risers are to be forged, the set of dies includes a blocker die, a forging die, a trim die and a coin die. The forging process starts with a slug of material being heated to a cherry red tint. The slug is placed in the blocker die and compressed until it has roughly assumed the general shape that is desired. The purpose of the blocker die is to produce a slug which will fit correctly in the forging die, thereby facilitating the subsequent forging operation.

In the forging operation the slug is placed in the forger die and compressed until the exact shape of the workpiece is achieved. This process also helps strengthen the metal by packing the molecules closer together. Next, the slug is placed in a trim die to rid it of any excess material. Finally, the workpiece is placed in coin die to ensure straightness and is heat treated for even greater strength and uniformity among risers.

The types of metals typically used to produce bow risers are aluminum alloys because of their strength, light weight and low cost.

Resin/fiber composite molding techniques, including resin transfer molding, hand lay-up molding, structural reaction injection molding and compression molding (all described in the Background of the Invention section) may be used in the method of the present invention.

The use of resin/fiber composite molding techniques permits the production of a light weight and strong bow. One advantage of molding a workpiece, rather than machining a stock rectangular volume of composite material, is that the fibers may be arranged differently for each resin design so that few fibers will be cut in the machining process. For example, the fibers for the molding of riser 12c would be arranged to be mostly contained within the outline of riser 12c as shown in FIG. 3. Hand lay-up molding, in which a preform may be custom made for a particular archery bow riser design, is ideal for permitting short production runs having unique fiber arrangements, including a production run of a single custom bow. For longer production runs, a preform may be mass produced, and resin transfer molding may be used.

Carbon fibers are typically the reinforcing material used in the production of archery bow risers. The strength and light weight characteristics of these composites make them ideal candidate materials for the production of bow risers. Fiberglass fibers may be combined with the carbon fibers to produce a bow having a particular set of mechanical properties. Epoxy resins are typically used because of their strength. The resin is typically cured at 150° C. Air bladder or foam inserts may be used to properly position the preform within the die.

After a set of workpieces is formed, each workpiece is machined to a desired final riser shape. As noted, because the workpiece shape is more similar to each final riser shape than a standard billet would be, the machining operation is simplified and produces less scrap. For a composite material bow riser the machining should be performed with a rapidly rotating diamond-tipped cutting tool to smoothly polish any fiber cuts.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of producing a first archery bow riser having a first shape and a second archery bow riser having a second shape, said method comprising the steps of:

(a) designing a workpiece having a third shape that encompasses said first shape and said second shape;

(b) producing a set of production dies for said workpiece;

(c) using said set of production dies to form a first one of said workpieces and a second one of said workpieces;

(d) machining said first one of said workpieces to produce said first riser and machining said second one of said workpieces to produce said second riser, thereby avoiding the design and manufacture of one set of dies for said first riser and an additional set of dies for said second riser.

2. The method of claim 1 wherein said workpieces are formed by forging.

3. The method of claim 1 wherein said workpieces are formed of resin/fiber composite material.

4. The method of claim 3 wherein said fibers are carbon fibers.

5. The method of claim 3 wherein said workpieces are formed by compression molding.

6. The method of claim 3 wherein said workpieces are formed by hand lay-up molding.

7. The method of claim 3 wherein said workpieces are formed by resin transfer molding.

8. The method of claim 3 wherein said workpieces are formed by structural reaction injection molding.

9. The method of claim 3 wherein said first one of said workpieces is formed so that said fibers are substantially contained within said first shape and wherein substantially no fibers are cut during said machining of said first workpiece.

10. The method of claim 3 wherein step (c) further includes using a preform having a first preform shape to form said first one of said workpieces and a preform having a second preform shape to form said second one of said workpieces.

11. The method of claim 3 wherein step (c) further includes arranging fibers in a first pattern in said set of production dies for said first one of said workpieces and arranging fibers in a second pattern in said set of production for said second one of said workpieces.

12. The method of claim 1 wherein said third shape encompasses further archery bow riser shapes and further archery bow riser shapes are produced.

* * * * *